ABSTRACT
United States Patent [19]
Lapinski

[11] 4,301,611
[45] Nov. 24, 1981

[54] FISHING LINE CASTER

[75] Inventor: Richard Lapinski, Fairfield West, Australia

[73] Assignee: Catuma Pty, Limited, New South Wales, Australia

[21] Appl. No.: 49,828

[22] Filed: Jun. 18, 1979

[30] Foreign Application Priority Data

Jun. 23, 1978 [AU] Australia .................. PD4846/78

[51] Int. Cl.³ .............................................. A01K 89/04
[52] U.S. Cl. ........................................ 43/18 R; 242/96
[58] Field of Search ............... 43/17.5, 18 R, 20, 27.4, 43/34.5 R, 43.11; 242/96, 84.2 J

[56] References Cited
U.S. PATENT DOCUMENTS

| | | | |
|---|---|---|---|
| 868,722 | 10/1907 | Tanner | 43/20 |
| 2,691,492 | 10/1954 | Lang | 242/96 |
| 2,753,131 | 7/1956 | Erdman | 43/18 R |
| 4,048,743 | 9/1977 | Lapinski | 43/18 R |

Primary Examiner—Stephen G. Kunin
Assistant Examiner—Robert P. Olszewski
Attorney, Agent, or Firm—Millen & White

[57] ABSTRACT

A fishing line caster comprising an elongate handle with a side casting spool disposed about one end and adapted to rotate about the handle and a casting guide connected to the handle and forming an upstanding skirt extending about the periphery of the spool and spaced radially therefrom, line positioning apparatus being formed on the skirt to maintain the line extending in some predetermined orientation relative to the caster prior to the line being cast.

11 Claims, 4 Drawing Figures

FISHING LINE CASTER

The present invention relates to a hand caster which can be used by a fisherman to cast a fishing line.

Fishing reels are of basically two types, the tangential cast type and the side cast type. The tangential cast type are normally connected to a rod with the axis of rotation of the spool of the reel lying transversely of the longitudinal axis of the rod. The side cast type is by contrast more usually held in one hand of a user and the line cast with the outer hand. In this latter case the line feeds off one side of the spool after the cast has been made. In either case a certain amount of expertise is requied to cast a line from a reel and in almost all cases the fisherman is required to use two hands to cast a line. The present invention is directed to a fishing line caster which can be used to cast a line using only one hand and with which novices may achieve satisfactory casts.

The present invention consists in a fishing line caster comprising an elongate handle, a side casting spool disposed about one end of the handle, and a casting guide connected to the handle and forming an upstanding skirt extending about at least a portion of the periphery of the spool and spaced radially therefrom, the casting guide being formed with line positioning means adapted to maintain the line extending in a predetermined orientation relative to the casting guide immediately prior to a line being cast from the fishing line caster.

In a preferred embodiment of the invention the casting guide is further formed with a line rewinding guide adapted to guide a line being rewound onto the fishing line caster onto the spool. This rewinding guide preferably comprises an aperture formed in the skirt surrounding the reel, which aperture is positioned radially outwardly of that portion of the spool onto which the line is preferentially wound and opens into the edge of the skirt distal to the handle through a narrow slit.

In a further preferred embodiment of the invention the handle houses light emitting means which are adapted to project light outwardly of the fishing line caster. The light emitting means is preferably disposed within the handle at the end adjacent the spool.

Hereinafter given by way of example only is a preferred embodiment of the invention described with reference to the accompanying drawings in which.

Figure 1:
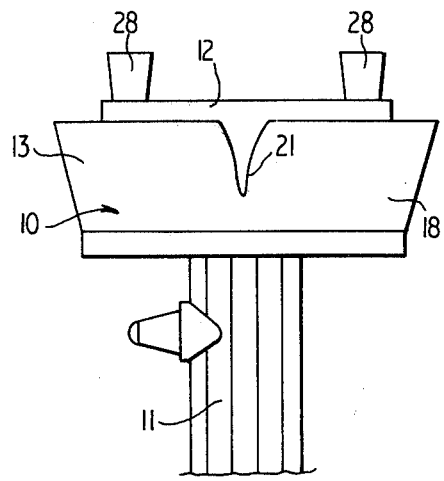
FIG. 1 is a side elevational view of a fishing line caster according to this invention taken from a first side thereof.
Figure 2:
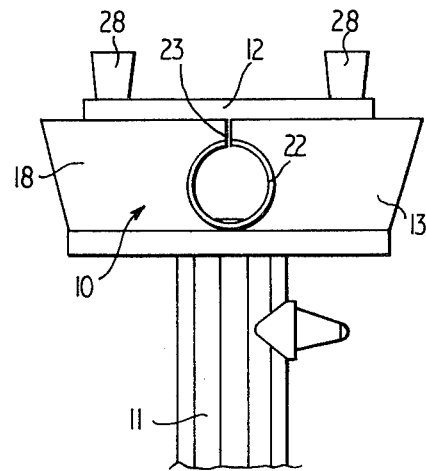
FIG. 2 is a side elevational view of the fishing line caster of FIG. 1 taken from a diametrically opposite side.
Figure 3:
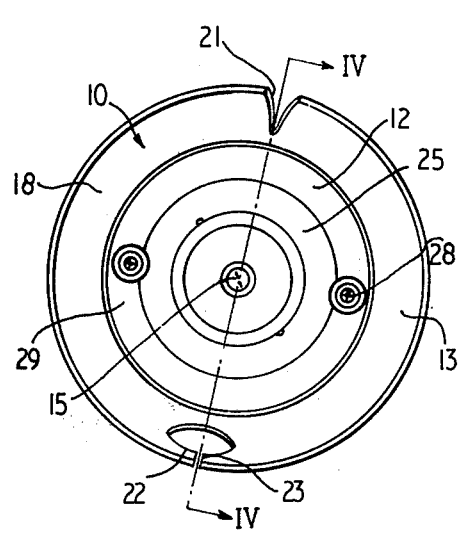
FIG. 3 is a plan view of the fishing line caster of FIG. 1.
Figure 4:
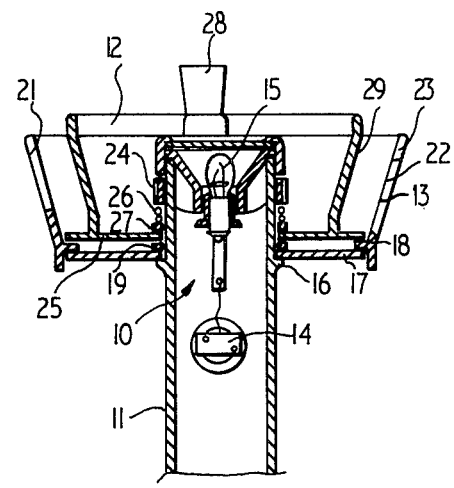
FIG. 4 is a cross-sectional view of the fishing line caster taken along IV—IV of FIG. 3.

The fishing line caster 10 comprises a handle 11, a spool 12 and a casting guide 13. The handle (shown foreshortened for convenience in the attached drawings), which is closed at the end not shown, is a tube of circular cross-section adapted to contain batteries (not shown) and is provided with a switch 14 operatively connected with a light bulb 15. The handle 11 is formed adjacent its open end with an annular flange 16 and is threaded externally between the flange 16 and the adjacent end of the handle 11.

The casting guide 13 comprises an annular plate 17 and an upstanding skirt 18 formed integrally. The plate 17 is formed with an aperture through which the threaded end of the handle 11 projects. The casting guide 13 is held in position on the handle 11 by nut 19 which clamps the plate 17 against the flange 16. The upstanding skirt 18 extends about the periphery of the spool 12 but is spaced radially therefrom. It is formed on one side with a V-shaped notch 21 opening into its free edge which acts as a line positioning means during casting. The diametrically opposite side of the skirt 18 is formed with a rewinding guide in the form of an aperture 22 which is connected with the free edge of the skirt 18 by the narrow slit 23.

The spool 12 is of the side cast type and is rotatably held in position on the threaded end of the handle 11 by nut 24 which bears on the locking plate 25 of the spool 12 though the spring 26 and washer 27. The backing plate 25 is resiliently urged into contact with the nut 19 by the spring 26 and the ease with which the spool 12 may be rotated relative to the handle 11 may be adjusted by rotated nut 24 to increase or decrease the compression in the spring 26. Knobs 28 are provided on the spool 12 on the free edge of the drum portion 29 of the spool 12.

In use a fishing line is wound about the drum portion 29 of the spool 12 and is provided on its free end with a suitable hook and sinker or lure. To cast the line the line is positioned in the base of the V-shaped notch 21 with the sinker or lure a short distance outside the skirt 18. The line can then be cast by holding the handle in one hand and moving the fishing line caster rapidly in an arc away from the side of the caster having the notch 21 with a flicking motion of the caster's arm or writst. The sinker or lure is thereby caused to move outwardly of the caster substantially along the longitudinal axis of the handle 11 and carries the line with it thereby achieving the cast.

To rewind the fishing line onto the spool 12 the line is slipped through slit 23 into aperture 22 and the spool 12 rotated via knobs 28. The line is thereby guided onto the mid section of the drum portion 29 of the reel 12 by the aperture 22 in the skirt 18 of the casting guide 13.

The fishing line caster is preferably formed by a synthetic plastics material but may if desired be formed of a suitable metal such as aluminium, or from any other suitable material.

It will be appreciated that the handle of the device may be adapted to store such things as a fishing knife; a tape measure; spare hooks, sinkers or lures; or any other useful fishing implement or accessory instead of or in addition to the light emitting means referred to above.

It will be recognised by persons skilled in the art that numerous variations and modifications may be made to the invention as described above without departing from the spirit or scope of the invention as broadly described.

I claim:

1. A fishing line caster comprising an elongate handle, a side casting spool disposed about one end of the handle, and a casting guide connected to the handle and forming an upstanding skirt extending about at least a portion of the periphery of the spool and spaced radially therefrom, the casting guide being formed with line positioning means adapted to initially maintain the line extending in a predetermined orientation relative to the casting guide outwardly of the longitudinal axis of the handle and with a weighted end of the line disposed exteriorly of the skirt immediately prior to a line being cast from the fishing line caster, and said positioning means operating to release the line from the skirt upon casting to allow the line to pay out at least initially in a direction generally parallel to the longitudinal axis of the handle between the spool and the skirt.

2. A fishing line caster as claimed in claim 1 in which the skirt is annular and extends completely around the periphery of the spool.

3. A fishing line caster as claimed in claim 1 or claim 2 in which the casting guide is further formed with a line rewinding guide adapted to guide a line being rewound onto the fishing line caster onto the spool.

4. A fishing line caster as claimed in claim 3 in which rewinding guide preferably comprises an aperture formed in the skirt surrounding the reel, which aperture is positioned radially outwardly of that portion of the spool onto which the line is preferentially wound and opens into the edge of the skirt distal to the handle through a narrow slit.

5. A fishing line caster as claimed in claim 1 in which the handle houses light emitting means which are adapted to project light outwardly of the fishing line caster.

6. A fishing line caster as claimed in claim 4 in which the light emitting means is disposed within the handle at the end adjacent the spool.

7. A fishing line caster as claimed in claim 1 in which the spool is adapted to rotate about the longitudinal axis of the handle.

8. A fishing line caster as claimed in claim 1 in which the line positioning means provides slot means for initially maintaining the line extending in predetermined orientation prior to a line being cast.

9. A fishing line caster as claimed in claim 8 in which the slot means opens at the free edge of the skirt for releasing the line upon casting.

10. A fishing line caster as claimed in claim 9 in which the slot means diverges from a narrow portion outwardly at the free edge of the skirt.

11. A fishing line caster as claimed in any one of claims 8, 9 or 10, in which the casting guide is further formed with a line rewinding guide adapted to guide a line being rewound onto the spool of the fishing line caster.

* * * * *